(12) United States Patent
Fu et al.

(10) Patent No.: US 9,087,263 B2
(45) Date of Patent: Jul. 21, 2015

(54) VISION BASED PEDESTRIAN AND CYCLIST DETECTION METHOD

(71) Applicant: Chung-Shan Institute of Science and Technology, Armaments Bureau, M.N.D, Taoyuan County (TW)

(72) Inventors: Li-Chen Fu, Taoyuan County (TW);
Pei-Yung Hsiao, Taoyuan County (TW);
Cheng-En Wu, Taoyuan County (TW);
Yi-Ming Chan, Taoyuan County (TW);
Shao-Chung Hu, Taoyuan County (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 84 days.

(21) Appl. No.: 14/100,106

(22) Filed: Dec. 9, 2013

(65) Prior Publication Data
US 2015/0161447 A1   Jun. 11, 2015

(51) Int. Cl.
*G06K 9/00* (2006.01)
*G06K 9/46* (2006.01)
(52) U.S. Cl.
CPC .............. *G06K 9/46* (2013.01); *G06K 9/00664* (2013.01); *G06T 2207/10016* (2013.01)

(58) Field of Classification Search
None
See application file for complete search history.

(56) References Cited

U.S. PATENT DOCUMENTS

| | | | |
|---|---|---|---|
| 2009/0010495 A1* | 1/2009 | Schamp et al. | 382/106 |
| 2009/0016571 A1* | 1/2009 | Tijerina et al. | 382/104 |
| 2013/0251194 A1* | 9/2013 | Schamp | 382/103 |
| 2014/0112537 A1* | 4/2014 | Frank et al. | 382/103 |

* cited by examiner

*Primary Examiner* — Shervin Nakhjavan
(74) *Attorney, Agent, or Firm* — Chun-Ming Shih

(57) ABSTRACT

A vision based pedestrian and cyclist detection method includes receiving an input image, calculating a pixel value difference between each pixel and the neighbor pixels thereof, quantifying the pixel value difference as a weight of pixel, proceeding statistics for the pixel value differences and the weights, determining intersections of the statistics as a feature of the input image, classifying the feature into human feature and non-human feature, confirming the human feature belonging to cyclist according to the spatial relationship between the human feature and the detected two-wheeled vehicle, and retaining one detection result for each cyclist by suppressing other weaker spatial relationships between the human feature and the detected two-wheeled vehicle.

7 Claims, 5 Drawing Sheets

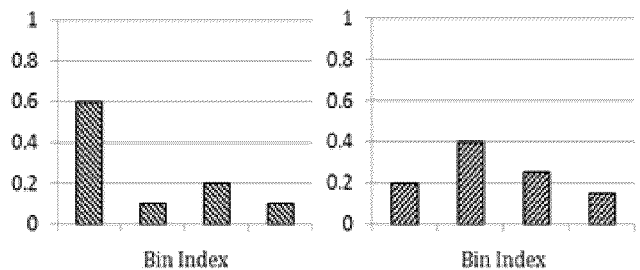
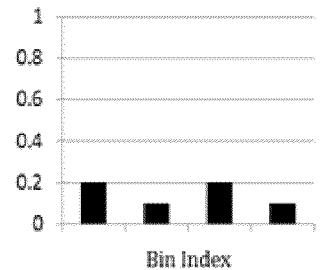
Fig. 5a     Fig. 5b     Fig. 5c
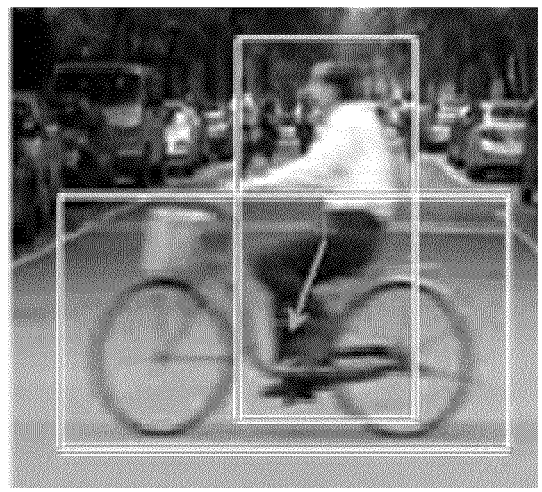
Fig. 6a     Fig. 6b

VISION BASED PEDESTRIAN AND CYCLIST DETECTION METHOD

BACKGROUND OF THE INVENTION

1. Field of the Invention

The present invention relates to an image detection method, and more particularly to the pedestrian and the cyclist recognition within an on-road image.

2. Description of the Related Art

In general, to achieve a pedestrian detection within an image, the conventional way is to proceed a model comparison. First of all, constructing a database including many kinds of features of human contours in different views and poses. Then, detecting the pedestrian within the image by comparing the feature of image and the predetermined database. If there is a feature within the image matching with the database, the feature can explicitly be read and recognized as a pedestrian.

As for cyclist detection, it is hard to recognize a cyclist on a two-wheeled vehicle, because both of the images are mutually blocked and therefore drastically leading a variation in appearance of the objects.

To the pedestrian and the cyclist, whichever is considered as an important on-road obstacle for roadway safety. Hence, an effective and precise detection to pedestrian and cyclist is expected to complete on-road safety.

SUMMARY OF THE INVENTION

The objective of the present invention is to provide a vision based pedestrian and cyclist detection method, which is capable of recognizing the feature of pedestrian and cyclist appeared in an image.

In order to achieve the foregoing purpose, the vision based pedestrian and cyclist detection method in accordance with the present invention has following steps: receiving an input image containing at least one human and at least one two-wheeled vehicle; calculating a pixel value difference between each pixel and the neighbor pixels thereof within the input image; quantifying the pixel value difference of each pixel, and defined as a weight of the pixel; proceeding statistics for the pixel value differences and the weights; determining intersections of the statistics as a feature of the input image; classifying the feature into human feature and non-human feature; proceeding a two-wheeled vehicle detection to the input image; confirming whether the human feature is belonging to cyclist if the spatial relationship between the human feature and the detected two-wheeled vehicle holds; and retaining one detection result for each cyclist by suppressing other weaker spatial relationships between the human feature and the detected two-wheeled vehicle.

As above illustrated steps, an aspect of the present invention is to incorporates a textural self similarity and the spatial relationship of detected objects to solve the pedestrian detection and cyclist confirmation. Accordingly, the overall performance of on-road human is further enhanced and of course improving the roadway safety.

BRIEF DESCRIPTION OF THE DRAWINGS

The invention, as well as its many advantages, may be further understood by the following detailed description and drawings in which:

FIGS. 5a-5c are two schematic histograms, whichever is constructed according to the same striped block of FIG. 3;

FIGS. 6a-6b illustrate the spatial relationship between a cyclist and a two-wheeled vehicle from rear view and side view respectively.

DETAILED DESCRIPTION OF THE INVENTION

In the present invention, a vision based pedestrian and cyclist detection method mainly harnesses the symmetry of objects, a two-wheeled recognition and plus a spatial relationship calculation between a cyclist and a vehicle, as a strategy to complete the pedestrian and cyclist detection. It is noted that, said vision based pedestrian and cyclist detection method in the present invention is proceeded by a computing processor.

Figure 1:
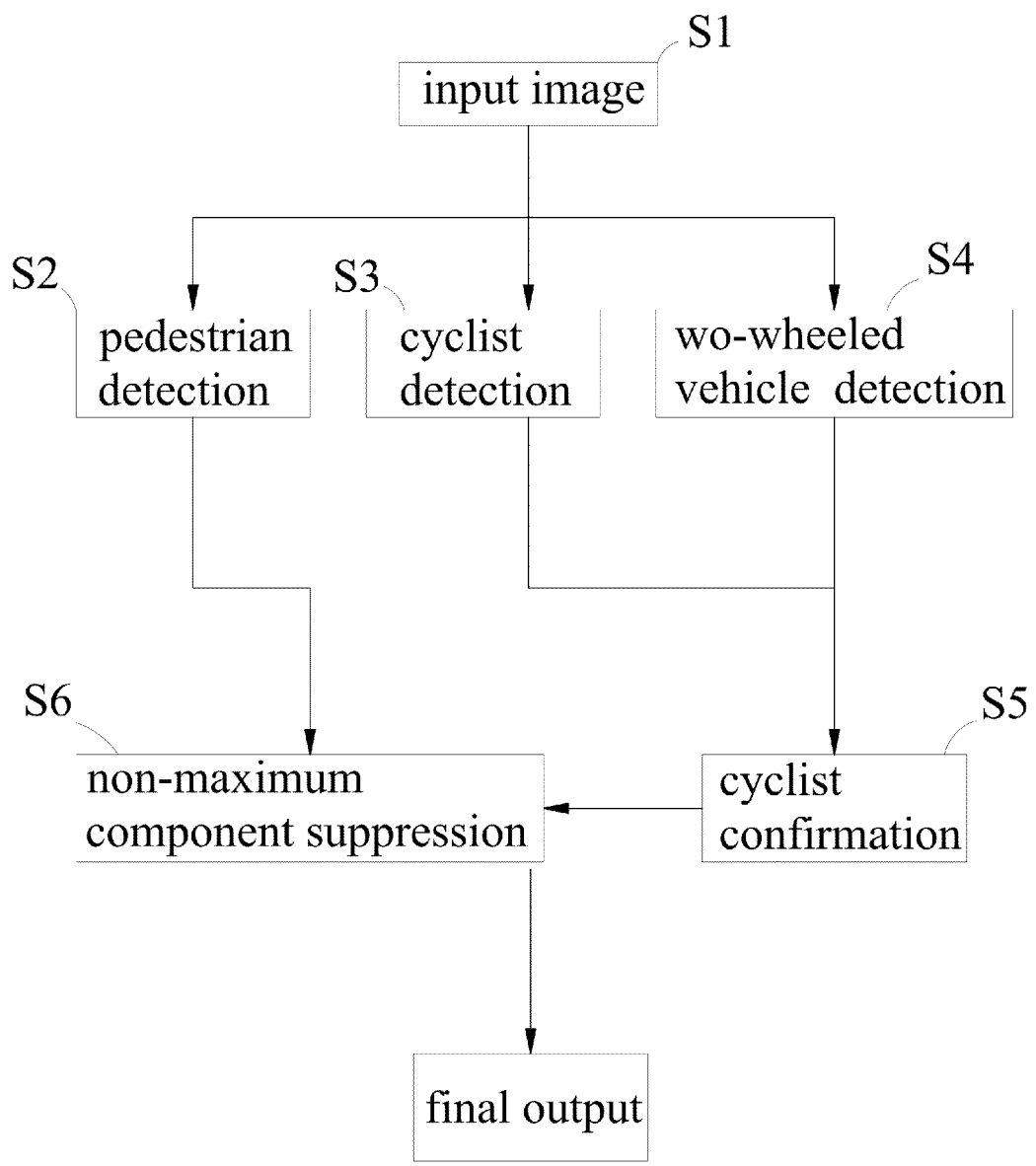
FIG. 1 is a flow chart showing a pedestrian and cyclist detection in accordance with the present invention.

With reference to FIG. 1, a flow chart of the vision based pedestrian and cyclist detection method in accordance with the present invention has following Steps S1-S6.

Step S1: input an image to be processed, which is captured by a camera recording on-road condition.

Step S2: proceed a pedestrian detection to the image according to the symmetry and the texture differentiation between objects, and output a pedestrian result.

Figure 2:
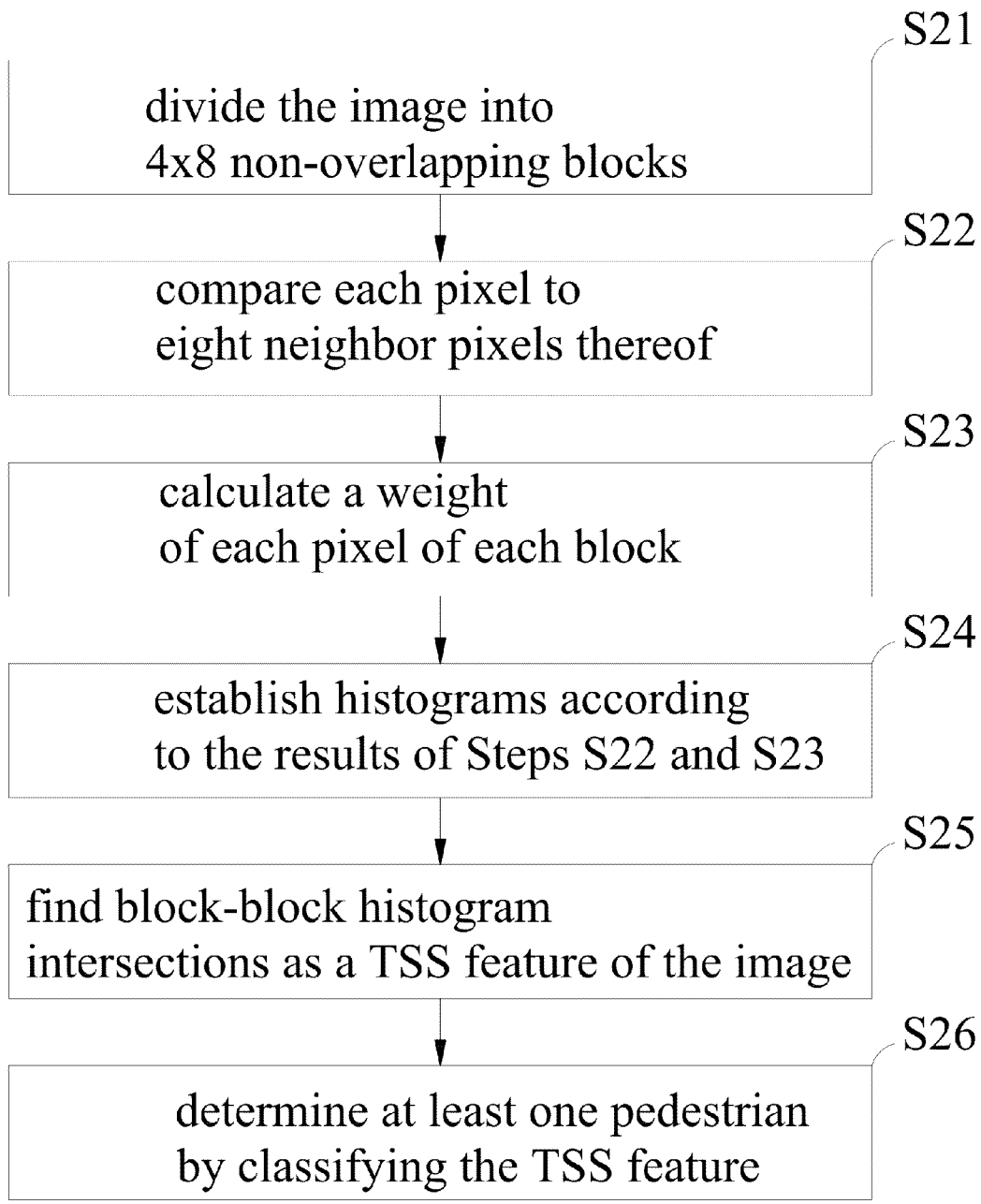
FIG. 2 is another flow chart showing Step S2 of FIG. 1 further has Steps S21-26.

With reference to FIG. 2, Step S2 is consisted of methods of histogram of oriented gradient (HOG), local oriented pattern histogram (LOP) and textural self-similarity (TSS), wherein the description and drawing of the HOG method are omitted due to being conventional in the art. The LOP method is then described in the following Steps S21-23. The TSS method is derived from LOP by further adding Steps S24-26 to the LOP method. It is noted, the methods of HOG, LOP and TSS are independently proceeded, and through these methods of Step S2, the image is then converted into a result having HOG, LOP and TSS features.

Step S21: divide the image into 4×8 non-overlapping blocks. For example, with reference to FIG. 3, a 64×128 pixels image is divided into 32 non-overlapping blocks with a 16×16 pixels per block.

Figure 4:
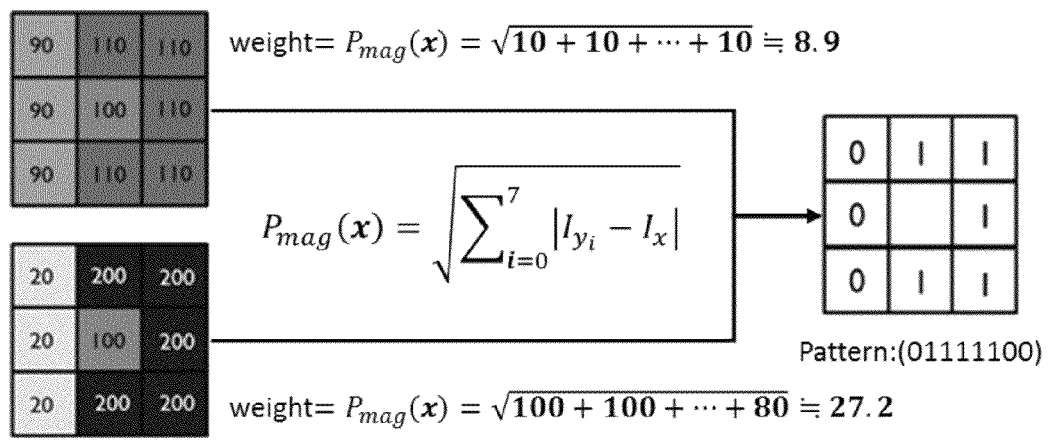
FIG. 4 illustrates a schematic diagram of how to calculate pattern and weight in each pixel as described in Steps S23-24.

Step S22: compare each pixel of each block to its eight neighbor pixels. With reference to FIG. 4, when a neighbor pixel has a pixel value (I) less than the center pixel, the neighbor pixel is then encoded as "0". On the contrary, the neighbor pixel has a pixel value larger than the center pixel, the neighbor pixel is then encoded as "1". As a result of that, each pixel of each block generates a pattern, an 8-bit binary number, which is read from the neighbor pixels in clockwise or counter-clockwise. As to the illustrated pattern (01111100) shown in FIG. 4, it is constructed by clockwise started from the upper "0", and there is a total of 256 combinations of patterns.

Step S23: calculate a weight of each pixel of each block (namely a weight of each pattern). Referring to FIG. 4, the weight calculation of the pixel is proceeded by a formula as illustrated, where x represents the location of the center pixel, y is the location of the neighbor pixel, and $P_{mag}(x)$ is defined as the weight of the pixel. For example, a pixel with pixel value 100 is surrounded by 8 neighbor pixels with pixel values of 90, 110, 110, 110, 110, 110, 90 and 90, then the weight of the pixel is calculated to 8.9 as illustrated in FIG. 4.

Figure 3:
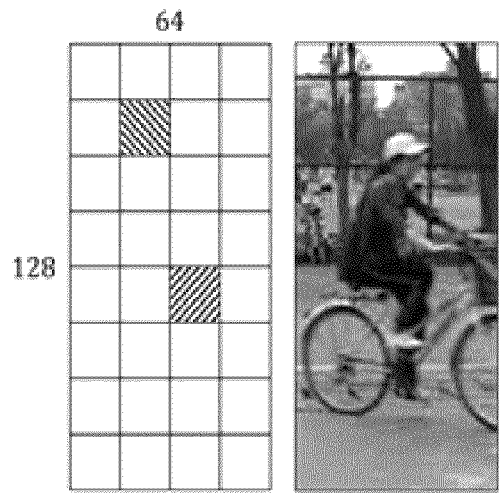
FIG. 3 is a contrast diagram showing an input image is dividing into 32 non-overlapping blocks for proceeding the method according to FIG. 1.

Step S24: establish LOP histograms according to the results of Steps S22 and S23. With reference to FIGS. 5a-5b, showing schematic histograms. With further reference back to FIG. 3, each block of the image is transferred and resulted in a histogram via a voting statistic method. With respect to the voting method, there are 256 bins for vote according to $2^8=256$ of the possible pattern combinations, which means the bin index is a set from 0 to 255. The weight of each pixel is considered as votes, which means a 16×16 pixels block performs 246 times of voting to the bins depending on the pattern of pixel, and results in the histogram thereof. For example, in a calculated block, a calculated pixel with pattern (01111100) and weight 8.9, the pixel is then voting in the bin 248 with 8.9 votes, and the other pixels within the calculated block are making the same to sum up the histogram.

As shown in FIGS. 3, 5a and 5b, illustrating that each block has different feature from other blocks, and therefore transferring to a result of different histograms via Step S24, where the abscissa represents the bin index and the ordinate represents the normalized sum of votes of the histogram.

Step S25: compute TSS feature of the image using block-block histogram intersections. With reference to FIG. 5c, an intersection result of the histogram according to FIGS. 5a and 5b. Due to there are 32 non-overlapping blocks in the image, it leads to a result of $C_2^{32}=496$ intersections which are considered as the result of TSS feature of the image.

Step S26: carry out the pedestrian detection with the use of a pre-trained classifier to classify whether the HOG, LOP and the TSS feature of the image has the same feature of the pedestrian. The classifier is trained by a linear supported vector machine (SVM) which is commonly used in the related art, so the detail description thereof is omitted for brevity. At the last, the pedestrian and the position within the image is recognized, and finally output the pedestrian result.

Step S3: proceed a cyclist detection to the image according to the detection method of Step S2, and output a cyclist candidate result. However, to achieve the cyclist detection, features of cyclist from different views and poses are also needed, and therefore the linear SVM classifier further includes numerous cyclist features of the training samples. Thereby, the image having cyclist feature is recognized with the use of TSS method, and output the cyclist candidate result.

Step S4: proceed a two-wheeled vehicle detection and output a two-wheeled vehicle candidate result. An algorithm for detecting circles is applied to detect the wheels, and the wheels further transferred to a wheel feature. The algorithm primarily includes steps of an edge detection, circle detection and wheel-matching estimation. Due to the algorithm for wheeled detection is commonly applied in the art, the description thereof is omitted for brevity.

Step S5: proceed a cyclist confirmation according to a spatial relationship between cyclist and two-wheeled vehicle. The results of the cyclist detection (S3) and the two-wheeled detection (S4) are herein combined to be calculated to find out a real position of cyclist. Because the cyclist detection (S3) may sometimes output the result having pedestrian, therefore the further cyclist confirmation is needed for reducing false alarms.

With reference to FIGS. 6a-6b, illustrating the spatial relationship between cyclist and two-wheeled vehicle, whichever from rear view or side view has a stable relationship therebetween. As shown in FIGS. 6a-6b, each bounding box for cyclist and vehicle has a centroid that moving with the object. Hence, horizontal and vertical differences ($\Delta x$ and $\Delta y$) between the centroids and a relative ratio are defined as the following formulas:

$$\Delta x = \frac{x_h - x_v}{\sqrt{s_h \times s_v}} \quad (1)$$

$$\Delta y = \frac{y_h - y_v}{\sqrt{s_h \times s_v}} \quad (2)$$

$$\text{ratio} = \frac{s_h}{s_v} \quad (3)$$

where $\Delta x$ and $\Delta y$ are defined as the horizontal geometric mean and vertical geometric mean, $x_h$ and $y_h$ and represent the centroid position of the cyclist, $x_v$ and $y_v$ and represent the centroid position of the two-wheeled vehicle, $s_h$ and $s_v$ represent scale of the cyclist and the two-wheeled vehicle respectively.

After obtaining the spatial relationship between the cyclist and two-wheeled vehicle, calculate a probability according to the spatial relationship by the following formula:

$$Prob_{matching}(W) = G(\Delta x) \times G(\Delta y) \times G(\text{ratio}) \quad (4)$$

$$G(x) = \frac{1}{\sqrt{2\pi\sigma^2}} e^{\frac{-(x-\mu)^2}{2\sigma^2}} \quad (5)$$

where $Prob_{matching}(W)$ is a probability that the cyclist matches the two-wheeled vehicle, W represents a window of the image (as shown in FIG. 6a or 6b), and G(x) is a formula of Gaussian distribution (normal distribution).

Furthermore, calculate a probability of appearance by the following formula:

$$Prob_{appearance}(W) = \frac{1}{1 + e^{-score(W)}} \quad (6)$$

where score(W) is given by the pre-trained SVM classifier, wherein the SVM classifier is trained with plural results from a conventional feature extraction method to the image, herein the description is omitted.

Then combine the $Prob_{appearance}(W)$ with the $Prob_{matching}(W)$ via a multiple operator, shown in the following formula:

$$Prob_{final}(W) = Prob_{matching}(W) \times Prob_{appearance}(W) \quad (7)$$

where the value of $Prob_{final}(W)$ represents a probability whether the detected cyclist result from Step S3 belongs to a cyclist. When the value of $Prob_{final}(W)$ for a window is higher than a predetermined threshold, the detected target in the bounding box is then classified as a cyclist; otherwise is classified as an on-road human or other objects. Finally, the cyclist confirmation is accomplished, and output a cyclist result.

Figure 7:
FIG. 7 shows a combination output from Steps S2 and S5 without applying Step S6, non-maximum suppression.

Step S6: proceed a non-maximum component suppression to suppress the lower probability result and output a optimized detection. The pedestrian result from Step S2 and the cyclist result from Step S5 are combined before output. With reference to FIG. 7, however, the combination of the pedestrian and the cyclist results may have overlapping detections for an on-road human(the pedestrian or the cyclist), which means more than one bounding box would be presented on an object after output. To overcome this problem, the first is to find out a maximum value of $Prob_{final}(W)$ among the detection results for the object, and suppress the relatively low values. As a result, each on-road human within the image presents only one detection result (bounding box) so as to make explicit for user observation.

In summary, a human can be precisely recognized through presented continuous boundaries, salience and symmetry thereof. The present invention harnesses the TSS method for the part of salience and symmetry, two-wheeled vehicle recognition for the part of boundary, and further incorporates with the spatial relationship between human and vehicle to confirm a position of the cyclist. Accordingly, the overall performance of pedestrian and cyclist detection is therefore enhanced.

Many changes and modifications in the above described embodiment of the invention are able to, of course, be carried out without departing from the scope thereof. Accordingly, to promote the progress in science and the useful arts, the invention is disclosed and is intended to be limited only by the scope of the invention.

What is claimed is:

1. A vision based pedestrian and cyclist detection method, proceeded by a computing processor, comprising the following steps of:
    receiving an input image containing at least one human and at least one two-wheeled vehicle;
    calculating a pixel value difference between each pixel and the neighbor pixels thereof within the input image;
    quantifying the pixel value difference of each pixel, and defined as a weight of the pixel;
    proceeding statistics for the pixel value differences and the weights;
    determining intersections of the statistics as a feature of the input image;
    classifying the feature into human feature and non-human feature;
    proceeding a two-wheeled vehicle detection to the input image;
    confirming whether the human feature is belonging to cyclist if when the spatial relationship between the human feature and the detected two-wheeled vehicle holds; and
    retaining one detection result for each cyclist by suppressing other weaker spatial relationships between the human feature and the detected two-wheeled vehicle.

2. The vision based pedestrian and cyclist detection method as claimed in claim 1, wherein the pixel value difference is encoded as an 8-bit binary number.

3. The vision based pedestrian and cyclist detection method as claimed in claim 2, wherein the weight of the pixel is defined by a following formula:

$$\text{weight} = \sqrt{\sum_{i=0}^{7} |I_{y_i} - I_x|},$$

where I is a pixel value, x is the pixel, and y is the neighbor of the pixel.

4. The vision based pedestrian and cyclist detection method as claimed in claim 3, wherein the result of statistics is a set of histograms, each histogram is constructed according to the pixel value difference and the weight of pixel.

5. The vision based pedestrian and cyclist detection method as claimed in claim 4, wherein classifying the feature into human feature and non-human feature is achieved by a pre-trained linear supported vector machine (SVM) classifier.

6. The vision based pedestrian and cyclist detection method as claimed in claim 5, wherein the spatial relationship between the human feature and the detected two-wheeled vehicle is described by a horizontally geometric mean, a vertically geometric mean and a relative ratio, of the human feature and the detected two-wheeled vehicle.

7. The vision based pedestrian and cyclist detection method as claimed in claim 5, wherein the spatial relationship between the human feature and the detected two-wheeled vehicle is converted into a probability to be compared with a predetermined threshold to confirm whether the human feature belongs to cyclist.

* * * * *